United States Patent Office 3,476,760
Patented Nov. 4, 1969

3,476,760
SUBSTITUTED PIPERIDINOALKYLTHIA-
NAPHTHENES AND BENZOFURANS
Carl Kaiser, Haddon Heights, N.J., and Charles L. Zirkle,
Berwyn, Pa., assignors to Smith Kline & French Laboratories, Philadelphia, Pa., a corporation of Pennsylvania
No Drawing. Continuation-in-part of application Ser. No.
620,628, Mar. 6, 1967. This application Sept. 22, 1967,
Ser. No. 669,707
Int. Cl. C07d *63/18, 29/34;* A61k *27/00*
U.S. Cl. 260—293.4                    18 Claims

ABSTRACT OF THE DISCLOSURE 1-(thianaphthenylalkyl or benzofuranylalkyl)-4-phenyl-4-piperidinols, prepared by various methods starting with a halomethylthianaphthene or benzofuran, or a thianaphthene- or benzofuranalkanoic acid. 4-phenyl-4-piperidinols are condensed with acid halides, ester anhydrides, or diazoketones to give amides, which are reduced to the products with lithium aluminum hydride. Esters are prepared by acylation of the piperidinols. Tetrahydropyridines are prepared by dehydration of the piperidinols. The piperidinol and tetrahydropyridine compounds have tranquilizing activity, while the esters have analgesic activity.

---

This application is a continuation-in-part of copending application Ser. No. 620,628, filed Mar. 6, 1967, and now abandoned.

This invention relates to thianaphthene and benzofuran compounds having pharmacological activity. In particular, the invention relates to 4-aryl-4-hydroxypiperidinoalkyl derivatives of thianaphthenes and benzofurans having tranquilizing and analgesic activity.

The compounds of the invention are represented by the following structural formula:

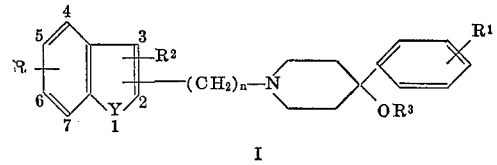

I wherein:
R is hydrogen, chloro, bromo, fluoro, trifluoromethyl, lower alkyl of up to about 4 carbon atoms, or lower alkoxy of up to about 4 carbon atoms;

$R^1$ is hydrogen, chloro, bromo, methyl, trifluoromethyl, fluoro, or methoxy;
$R^2$ is hydrogen or methyl;
$R^3$ is hydrogen or lower alkanoyl of up to 6 carbon atoms;
Y is sulfur, sulfone, or oxygen; and
$n$ is a positive integer from 2 to 4.

Also part of the invention are the pharmaceutically acceptable acid addition salts of the compounds of Formula I. Among these salts are the hydrochloride, hydrobromide, sulfate, nitrate, maleate, tartrate, citrate, or ethanedisulfonate.

Among the preferred groups of compounds are those where R is hydrogen, chloro, and fluoro and is at the 5 or 6-position; $R^1$ is hydrogen, chloro, or fluoro and is at the p-position; $R^2$ is hydrogen; $R^3$ is hydrogen; Y is sulfur; and $n$ is 3.

A further group of compounds considered part of the present invention are the intermediate compounds represented by the following structural formula:

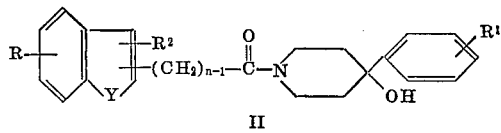

II where R, $R^1$, $R^2$, $n$, and Y are as defined above.

Another group of compounds considered part of the invention are those of the following structural formula, which are active as tranquilizers:

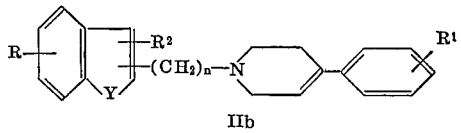

IIb where R, $R^1$, $R^2$, $n$, and Y are as defined above.

The compounds of the invention are prepared by various methods which are hereinbelow described. They involve condensation of a 4-phenyl-4-piperidinol with a derivative of an optionally substituted benzofuran- or thianaphthenealkanoic acid. Such derivatives may be an ester anhydride with ethyl chloroformate, an acid halide, or a diazo ketone.

The compounds of the invention where $n$ is 3 and $R^2$ is hydrogen are preferably prepared according to the procedures illustrated schematically below:

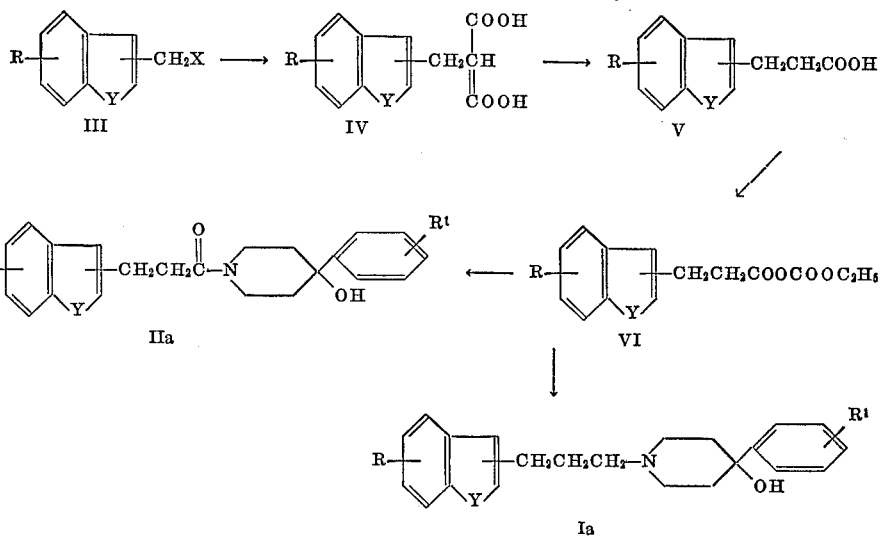

A 2 or 3-halomethylthianaphthene or benzofuran (III) is condensed with diethyl malonate in the presence of a base such as sodium ethoxide or sodium hydride to give a substituted malonic ester, which is then hydrolyzed with aqueous alkali to give the malonic acid IV. Decarboxylation by heating at about 200–250° results in the formation of a substituted propionic acid (V), which is then condensed with ethyl chloroformate to give an ester anhydride (VI). Reaction with a 4-phenyl-4-piperidinol results in the formation of an intermediate amide (IIa). Reduction of this amide with a reagent such as lithium aluminum hydride in ether or tetrahydrofuran gives the final product Ia. The final product is converted to an acid addition salt by bringing together the free base, which may be dissolved in a solvent such as ether, alcohol, or acetone with the acid, which also may be in solution. A preferred method of salt formation involves the addition of ethereal hydrogenchloride to an ether solution of the free base.

The starting materials are either described in the literature or are prepared from known materials by means of published methods. For example, thianaphthene-3-propionic acid is described in Bull. Soc. Chim. France 1953, 185–90; 2-chloromethylthianaphthene is described in J. Am. Chem. Soc. 71, 2857 (1949); 2-chloromethylbenzofuran is described in J. Am. Chem. Soc. 73, 4400 (1951); 3-chloromethylthianaphthene is described in J. Chem. Soc. 1961, 1291–7; general methods for preparing substituted 2 or 3-halomethylthianaphthenes and benzofurans are described in U.S. Patent 3,070,606.

The 3-halomethylthianaphthene starting materials are conveniently prepared from substituted thiophenols, as follows:

The substituted thiophenol is dissolved in an aqueous solution containing an equivalent amount of an alkali metal hydroxide, such as sodium or potassium hydroxide, and treated with an equivalent amount of chloroacetone at about 20–25° for 20 to 60 minutes. The reaction mixture is diluted with a water-immiscible solvent such as ether. The organic layer is separated, solvent evaporated and the residue distilled in vacuo to obtain the 1-phenylmercapto-2-propanone. This propanone is cyclized by heating at 160–180° for 30–45 minutes with a dehydrating agent, such as zinc chloride or, preferably, phosphorus pentoxide, to obtain the 3-methylthianaphthene, which is then treated with a halogenating agent such as, preferably, N-bromosuccinimide to give the 3-bromomethylthianaphthene.

The 2-halomethylthianaphthene starting materials are prepared as follows:

An ether solution of the thianaphthene is added to an ether solution containing lithium and butyl bromide, butyl lithium being present in about a four-fold excess, and the mixture refluxed for one to two hours. Approximately a four-fold excess of gaseous formaldehyde is bubbled into the solution over a period of three to five hours. Water and a lower alcohol, such as ethanol, are added; the mixture is made acidic with hydrochloric acid; the ether layer is separated and evaporated to obtain the 2-hydroxymethylthianaphthene as the residue, which is purified by recrystallization from a suitable solvent, such as n-heptane. Reaction of the hydroxymethyl compound with a chlorinating agent, such as phosphorus trichloride, phosphorus pentachloride or, preferably, thionyl chloride, yields the starting material, 2-chloromethylthianaphthene.

A 3-halomethylbenzofuran starting material is conveniently prepared by bromination of a 3-methylbenzofuran with at least two molar equivalents of N-bromosuccinimide in the presence of a catalytic amount of benzoyl peroxide to give the 2-bromo-3-bromomethylbenzofuran which is then treated as outlined previously, except that at some point during the reaction sequence, preferably after the decarboxylation, the 2-bromo-3-propionic acid is hydrogenated in the presence of a catalyst such as Raney nickel to remove the 2-bromine.

The 2-halomethylbenzofuran starting materials are prepared from a coumarilic acid by reduction with a bimetallic hydride such as lithium aluminum hydride and chlorination of the resulting 2-hydroxymethylbenzofuran with a chlorinating agent such as phosphorus pentachloride, phosphorus trichloride or, preferably, thionyl chloride.

The compounds of the invention wherein $n$ is 2 are preferably prepared by condensing the acid halide of a thianaphthene or benzofuran-2- or 3-acetic acid with the appropriate 4-phenyl-4-piperidinol to give the acetamide, and this amide reduced with a reagent such as lithium aluminum hydride. The requisite acetic acids are either described in the literature or are prepared by reaction of a halomethylthianaphthene or benzofuran with an alkali metal cyanide such as sodium cyanide, and then hydrolyzing the resulting acetonitrile with a base such as aqueous potassium hydroxide.

The compounds of the invention wherein $n$ is 4 are preferably prepared by homologating the corresponding propionic acid intermediates through the use of the Arndt-Eistert reaction. The acid is converted to its acid halide, condensed with diazomethane, and the resulting diazoketone treated with a 4-phenyl-4-piperidinol in the presence of silver oxide to give an amide, which is reduced in the conventional manner to the product. Alternatively, the diazoketone is hydrolyzed with aqueous silver oxide to the butyric acid, which is then converted via its acid chloride to the 4-phenylpiperidine amide, and the amide reduced to the product in the customary manner.

The various product compounds wherein $R^2$ is methyl are generally prepared from the known carboxylic acids or halomethyl compounds possessing the methyl group. A further method for preparing 2- or 3-halomethyl compounds having a 2- or 3-methyl group involves reaction of a chloromethyl compound with magnesium and carbon dioxide [J. Am. Chem. Soc. 74, 766 (1952)] to give the methyl carboxylic acid, and subsequent conversion by disclosed methods of the carboxy group to the halomethyl and then to the higher alkanoic acids.

The compounds of the invention in which $R^3$ is lower alkanoyl are prepared by acylating the corresponding hydroxy compound in the conventional manner with an anhydride or acyl halide such as acetic anhydride, propionyl chloride, butyryl chloride, or hexanoyl chloride.

Compounds of Formula IIb, which are 1,2,5,6-tetrahydropyridines, are prepared by dehydration of the corresponding 4-piperidinols with refluxing concentrated hydrochloric acid.

Compounds in which Y is sulfone are prepared by oxidizing the corresponding thianaphthene in which Y is sulfur with 30% hydrogen peroxide and glacial acetic acid.

The piperidinol compounds ($R^3$=H) of Formula I and the tetrahydropyridine compounds of Formula IIb are tranquilizers. They have been found to cause a tranquilizing or sedative effect in rats when administered in oral doses of 200 mg./kg. They are formulated for use by combining them in amounts of 1–500 mg. with standard pharmaceutical excipients into solid and liquid oral dosage forms and injectables by methods well known to pharmaceutical chemists.

The ester compounds ($R^3$=alkanoyl) of Formula I are analgesics. They have been found to produce analgesia in rats in oral doses of 10–25 mg./kg. They are formulated for use by combining them in amounts of 1–250 mg. with standard pharmaceutical excipients into solid and liquid oral dosage forms and injectables by methods similarly well known to pharmaceutical chemists.

Oral dosage forms may be in the form of tablets, capsules, troches, or lozenges. In a tablet, the active component is generally incorporated into a solid carrier. Among the acceptable solid carriers are lactose, sucrose, magnesium stearate, stearic acid, starch, terra alba, talc, calcium phosphate, gelatin, agar, pectin, and acacia. A time-delay material such as glyceryl monostearate or glyceryl distearate, alone or with a wax, may also be included.

A capsule may be prepared by placing the active component, either alone or incorporated into a solid carrier, in a hard gelatin capsule. A liquid formulation may consist of the active component suspended or dissolved in a liquid carrier such as peanut oil, olive oil, sesame oil, or water. The liquid formulation may be consumed orally as such, included in a soft gelatin capsule, or placed in an ampule. An injectable formulation may consist of a solution of the active component in normal saline solution, water, or sugar solution, possibly with preservatives such as Merthiolate or parabens added.

Suppositories may also be prepared, containing 1–50 mg. of active compound and such components as glycerin, glycerin monopalmitate, glyceryl monostearate, hydrogenated cocoanut oil fatty acids, and lecithin.

The following examples are intended to illustrate the preparation of the compounds of the invention, but are not to be construed as limiting the scope thereof.

EXAMPLE 1

1-[3-(5-chloro-2-thianaphthenyl)propyl]-4-phenyl-4-piperidinol

To a stirred mixture of 5.38 g. of 56.1% NaH in mineral oil (0.125 mole of NaH) in 75 ml. of dimethyl sulfoxide is added dropwise 20.1 g. (0.125 mole) of diethyl malonate in 20 ml. of dimethyl sulfoxide. The mixture is stirred in a hot water bath for a half hour, cooled to room temperature, and a solution of 13.67 g. (0.063 mole) of 5-chloro-2-chloromethylthianaphthene in 50 ml. of dimethyl sulfoxide added. The mixture is stirred on the steam bath for 1 hour, cooled, and poured into water. The mixture is then extracted with ether, and the ethereal extracts washed, dried, and evaporated. The residue is dissolved in acetonitrile, washed with petroleum ether, the petroleum ether solution washed with acetonitrile, and the combined acetonitrile solutions evaporated. The residue is distilled, the distillate up to 180°/0.5 mm. being discarded. The product diethyl (5-chloro-2-thianaphthenylmethyl)-malonate distills at 180–202°/0.5 mm.

A mixture of 8.3 g. (0.0244 mole) of the above malonate, 9.5 g. of KOH, 15 ml. of water, and 100 ml. of alcohol are refluxed with stirring overnight. The mixture is diluted with water and concentrated in vacuo to remove the alcohol. The residue is then diluted with water and ether, and the layers separated. The aqueous solution is washed with ether, the ether washed with water; the aqueous solution is acidified with HCl and extracted with ether. The ethereal extracts are dried and evaporated to give the (5-chloro-2-thianaphthenylmethyl)malonic acid, M.P. 194–196°.

The above malonic acid (6.5 g., 0.0229 mole) is heated in an oil bath to 240°, and kept at 210–230° for 1 hour. The resulting 3-(5-chloro-2-thianaphthenyl)propionic acid, when cooled, solidifies and melts at 135–145°.

To a solution of this propionic acid in 25 ml. of acetone is added a solution of 4.1 g. (0.04 mole) of triethylamine in 10 ml. of acetone. The solution is cooled to −10° and a solution of 4.35 g. (0.04 mole) of ethyl chloroformate in 10 ml. of acetone is added dropwise. The resulting solution is stirred in a salt-ice bath for 10 minutes and allowed to warm to room temperature, and a slurry of 9.2 g. (0.052 mole) of 4-phenyl-4-piperidinol in 60 ml. of acetone is added. The resulting mixture is stirred and refluxed for 2 hours and poured into water and ether. The layers are separated, the aqueous solution is washed with ether, and the combined ether extracts are washed, dried, and evaporated to give 1-[3-(5-chloro-2-thianaphthenyl)-propionyl]-4-phenyl-4-piperidinol, recrystallized from ethyl acetate-hexane, M.P. 123–126°.

To a stirred mixture of 4.5 g. of LiAlH$_4$ in 600 ml. of dry ether is added a solution of 9.1 g. (0.0227 mole) of the above amide in 100 ml. of dry tetrahydrofuran and 300 ml. of dry ether. The resulting mixture is stirred and refluxed for 2 hours, and water and 10% NaOH are added dropwise. The mixture is then filtered, the ethereal filtrate washed and extracted with dilute HCl and water, and the combined aqueous extracts made basic with NaOH. Extraction with ether, and washing, drying, and evaporating the ether extracts gives the title product. The compound is dissolved in alcohol, ethereal HCl is added, and the hydrochloride salt is filtered off and recrystallized from alcohol-ether; M.P. 218–220°.

EXAMPLE 2

4-phenyl-1-[3-(3-thianaphthenyl)propyl]-4-piperidinol

To a mixture of 4.12 g. (0.02 mole) of 3-(3-thianaphthenyl)propionic acid in 20 ml. of acetone and 4 ml. of water is added 3.6 g. (0.035 mole) of triethylamine in 10 ml. of acetone. The solution is cooled to −10° and a solution of 3.8 g. (0.035 mole) of ethyl chloroformate in 10 ml. of acetone is added dropwise. The resulting solution is stirred for 5 minutes at −10°, allowed to warm to room temperature, and 8.03 g. (0.0454 mole) of 4-phenyl-4-piperidinol in 50 ml. of acetone added. The resulting mixture is refluxed for 2 hours and allowed to stand for 2 days. The resulting white precipitate of the hydrochloride of the starting piperidinol is filtered off, the filtrate is evaporated in vacuo and triturated with methylene chloride, and the mixture again filtered. The filtrate is washed, dried, and evaporated and the residue of 4 - phenyl - 1 - [3 - (3 - thianaphthenyl)propionyl] - 4-piperidinol recrystallized by dissolving in hot ethyl acetate and reprecipitating with hexane; M.P. 94–98°.

To a stirred mixture of 2.0 g. of LiAlH$_4$ in 200 ml. of dry ether is added 5.0 g. (0.0137 mole) of the above amide in 400 ml. of dry ether. The resulting mixture is stirred and refluxed for 3 hours and allowed to stand overnight at room temperature. The mixture is then refluxed for a further 4 hours, water and 10% NaOH are added dropwise, and the mixture is filtered. The filtrate is washed with water and extracted with dilute HCl, and the combined aqueous solutions basified with NaOH. Extraction with ether-methylene chloride, and washing, drying, and evaporating the organic extracts gives the title product, M.P. 107–110°. The basic product is then dissolved in warm alcohol and filtered, and ethereal HCl added to the filtrate. The resulting hydrochloride salt is recrystallized from alcohol-ether and melts at 209–211°.

EXAMPLE 3

4-phenyl-1-[3-(2-thianaphthenyl)propyl]-4-piperidinol

To 250 ml. of absolute alcohol is added 4.6 g. (0.2 mole) of sodium cut into pieces. This mixture is stirred for one-half hour and 35.3 g. (0.22 mole) of diethyl malonate is then added. The mixture is then stirred and refluxed for 2 hours and a solution of 1.82 g. (0.1 mole) of 2-chloromethylthianaphthene in 90 ml. of dry ether is added. The ether is boiled off and the remaining solution is refluxed overnight. The reaction mixture is poured into ice water and extracted with ether. The ether extracts are washed, dried, and evaporated, and the residue is distilled. The forerun distilling up to 170°/0.5 mm. is discarded. The fraction boiling at 170–176°/0.5 mm. is collected and is diethyl (2-thianaphthenylmethyl)malonate.

A solution of 11.0 g. (0.0359 mole) of the above malonate and 15 g. of KOH in 500 ml. of ethanol and 50 ml. of water is refluxed with stirring for 4 hours and then evaporated in vacuo. The residue is dissolved in water, washed with ether, the ether washings being then washed with water, and the combined aqueous solutions acidified with HCl. The acidic solution is extracted with ether and the ether extracts washed, dried, and evaporated to give (2 - thianaphthenylmethyl)malonic acid, M.P. 181–183°.

The above malonic acid (7.6 g., 0.031 mole) is heated in an oil bath at 230–250° for one-half hour and the melt is cooled to give 3-(2-thianaphthenyl)propionic acid.

To a solution of this acid in 34 ml. of acetone is added a solution of 5.55 g. (0.0542 mole) of triethylamine in 13.5 ml. of acetone. The resulting solution is stirred in a salt-ice bath at −10–0° while a solution of 5.89 g. (0.0542 mole) of ethyl chloroformate in 13.5 ml. of acetone is added dropwise. The mixture is then stirred in ice for 10 minutes, allowed to warm to room temperature, and an additional 80 ml. of acetone added, followed by 12.45 g. (0.0704 mole) of 4-phenyl-4-piperidinol. The reaction mixture is refluxed for 2 hours, allowed to stand overnight at room temperature, and then poured into ether-water. The layers are separated, the aqueous layer washed with ether, and the combined ether extracts washed successively with water, dilute HCl, water, dilute NaOH, and water. When the ether solution is dried and evaporated, 4-phenyl-1-[3-(2-thianaphthenyl)propionyl]-4-piperidinol is obtained.

To a stirred mixture of 6.0 g. of LiAlH$_4$ in 800 ml. of dry ether is added a solution of 11.31 g. (0.031 mole) of the above amide in 80 ml. of dry tetrahydrofuran. The resulting mixture is refluxed for 3 hours and allowed to stand overnight at room temperature, and 25 ml. of water and 6 ml. of 10% NaOH added dropwise. The mixture is then stirred for one-half hour and filtered, and the filtrate washed with water and extracted with dilute HCl. The acidic extracts are basified with 40% NaOH and extracted with ether. The ether extracts are washed, dried, and evaporated to give the title product. This product is dissolved in alcohol and ethereal HCl added to give the hydrochloride salt of the product. Recrystallization is achieved using alcohol-ether; M.P. 209–211°.

EXAMLE 4

1-[3-(2-benzofuranyl)propyl]-4-phenyl-4-piperidinol

To a stirred mixture of 19.2 g. of 56.1% NaH in mineral oil (10.7 g., 0.444 mole of NaH) in 265 ml. of dimethyl sulfoxide is added dropwise a solution of 7.15 g. (0.444 mole) of diethyl malonate in 70 ml. of dimethyl sulfoxide. The mixture is then stirred in a hot water bath for 1 hour and cooled to room temperature. A solution of 37.3 g. (0.224 mole) of 2-chloromethylbenzofuran in 150 ml. of dimethyl sulfoxide is added dropwise, the mixture is refluxed with stirring for 1 hour, and is then poured into water-ether. The layers are separated, the aqueous solution is washed with ether, and the combined ether extracts are washed, dried and evaporated in vacuo. The residue is dissolved in acetonitrile and washed with petroleum ether, the petroleum ether solution extracted with acetonitrile, and the combined acetonitrile extracts evaporated in vacuo. The residue is distilled through a silvered column and the material distilling at 143°/0.5 mm. collected. This compound is diethyl (2-benzofuranylmethyl)malonate.

A mixture of 31.9 g. of KOH in 50 ml. of water and 31.9 g. (0.11 mole) of this malonate ester in 500 ml. of alcohol is stirred and refluxed for 3 hours and then evaporated in vacuo. The residue is dissolved in water and the aqueous solution washed with ether and acidified with concentrated HCl. The acid solution is extracted with ether and the ethereal extracts washed, dried, and evaporated to give (2-benzofuranylmethyl)malonic acid, M.P. 171–172°.

This acid (12.5 g., 0.0535 mole) is heated in an oil bath to 260° and allowed to cool, the product being 3-(2-benzofuranyl)propionic acid, M.P. 109–112°. This compound is dissolved in 40 ml. of acetone and 6.7 g. (0.0653 mole) of triethylamine in 16 ml. of acetone is added. The solution is cooled in salt-ice to 0–10° and a solution of 7.1 g. (0.0653 mole) of ethyl chloroformate in 16 ml. of acetone added dropwise. The resulting mixture is stirred with cooling for 10 minutes and allowed to warm to room temperature, after which a slurry of 15.0 g. (0.0849 mole) of 4-phenyl-4-piperidinol in 100 ml. of acetone is added. The mixture is stirred at reflux for 2 hours, allowed to stand overnight at room temperature, refluxed for an additional hour and a half, and then poured into water-ether. The layers are separated, the aqueous layer extracted with ether, and the combined ethereal solutions washed, dried, and evaporated in vacuo to give as a gum, 4-phenyl-1-[3-(2-benzofuranyl)propionyl]-4-piperidinol, which when ether is added solidifies; M.P. 103–105°.

To a stirred mixture of 7.5 g. of LiAlH$_4$ in 300 ml. of dry ether is slowly added a solution of 0.0374 mole of the above amide in 60 ml. of dry tetrahydrofuran and 600 ml. of dry ether. The mixture is stirred and refluxed for 3 hours, allowed to stand at room temperature overnight, and then 30 ml. of water and 7.5 ml. of 10% NaOH cautiously added. The mixture is filtered, the filter cake being washed well with tetrahydrofuran, and the combined organic extracts extracted with dilute HCl. The acidic extracts are made basic with 40% NaOH, extracted with ether, and the ethereal extracts washed, dried, and evaporated in vacuo to give the title product. A hydrochloride salt is formed by adding to an alcoholic solution of the free base ethereal HCl and recrystallizing from alcohol-ether; M.P. 148–151°.

EXAMPLE 5

1-[3-(3-benzofuranyl)propyl-4-phenyl-4-piperidinol

The procedures of Examples 1, 3 or 4 are followed. 3-chloromethylbenzofuran is condensed with sodio diethyl malonate to give diethyl (3-benzofuranylmethyl)malonate. The malonate is hydrolyzed to the diacid with aqueous KOH, monodecarboxylated by heating, ethyl chloroformate is added to the triethylamine salt of the resulting propionic acid, and 4-phenyl-4-piperidinol added to the resulting ester anhydride to give a propionamide. The amide is reduced to the product with LiAlH$_4$.

EXAMPLE 6

4-p-chlorophenyl-1-[3-(3-thianaphthenyl)propyl]-4-piperidinol

The procedure of Example 2 is followed. 3-(3-thianaphthenyl)propionic acid is converted to its triethylamine salt and then the salt allowed to react with ethyl chloroformate. The resulting ester anhydride is condensed with 4-p-chlorophenyl-4-piperidinol to give an amide, which is reduced with LiAlH$_4$ to give the product.

Use of 4-p-tolyl-4-piperidinol or 4-p-trifluoromethylphenyl-4-piperidinol in the above procedure instead of 4-p-chlorophenyl-4-piperidinol results in the formation of 1 - [3 - (3 - thianaphthenyl)propyl] - 4 - p - tolyl - 4-piperidinol or 1 - [3 - (3 - thianaphthenyl)propyl] - 4 - p-trifluoromethylphenyl-4-piperidinol, respectively.

Use of 4-m-bromophenyl-4-piperidinol or 4- o-tolyl-4-piperidinol in the above procedure instead of 4-p-chlorophenyl-4-piperidinol results in the formation of 4-m-bromophenyl - 1 - [3 - (3 - thianaphthenyl)propyl] - 4-piperidinol or 1 - [3 - (3 - thianaphthenyl)propyl] - 4 - o-tolyl-4-piperidinol, respectively.

Use of fluoro or methoxy substituted phenylpiperidinols results in the formation of the corresponding fluoro or methoxy substituted products.

EXAMPLE 7

4-p-chlorophenyl-1-[3-(6-fluoro-3-thianaphthenyl)propyl]-4-piperidinol

The procedures of Examples 1, 3, or 4 are followed. 6-fluoro-3-chloromethylthianaphthene is condensed with sodio diethyl malonate to give diethyl (6-fluoro-3-thianaphthenylmethyl)malonate. The malonate is hydrolyzed to the diacid with aqueous KOH, the diacid monodecarboxylated by heating, ethyl chloroformate is added to the triethylamine salt of the resulting propionic acid, and 4-p-chlorophenyl-4-piperidinol added to the resulting ester anhydride to give a propionamide. Reduction of the amide with LiAlH$_4$ gives the product.

Use of 6-chloro-3-chloromethylthianaphthene as starting material instead of 6 - fluoro - 3 - chloromethylthianaphthene results in the formation of 4-p-chlorophenyl-1-[3-(6-chloro-3-thianaphthenyl)propyl]-4-piperidinol.

Use of 6-trifluoromethyl-3-chloromethylthianaphthene,
5-methyl-3-chloromethylthianaphthene,
5-butyl-2-chloromethylthianaphthene,
6-bromo-3-chloromethylbenzofuran,
6-methoxy-2-chloromethylthianaphthene, or
6-butoxy-2-chloromethylbenzofuran
as starting material instead of 6-fluoro-3-chloromethylthianaphthene results in the formation of
4-p-chlorophenyl-1-[3-(6-trifluoromethyl-3-thianaphthenyl)propyl]-4-piperidinol,
4-p-chlorophenyl-1-[3-(5-methyl-3-thianaphthenyl)propyl]-4-piperidinol,
1-[3-(5-butyl-2-thianaphthenyl)propyl]-4-p-chlorophenyl-4-piperidinol,
1-[3-(6-bromo-3-benzofuranyl)propyl]-4-p-chlorophenyl-4-piperidinol,
4-p-chlorophenyl-1-[3-(6-methoxy-2-thianaphthenyl)propyl]-4-piperidinol, or
1-[3-(6-butoxy-2-benzofuranyl)propyl]-4-p-chlorophenyl-4-piperidinol,
respectively.

Use of 4-p-fluorophenyl-4-piperidinol in the above procedure instead of 4-p-chlorophenyl-4-piperidinol results in the formation of 4-p-fluorophenyl-1-[3-(6-fluoro-3-thianaphthenyl)propyl]-4-piperidinol.

EXAMPLE 8

4-phenyl-1-[2-(3-thianaphthenyl)ethyl]-4-piperidinol

A mixture of 15.0 g. (0.0824 mole) of thianaphthene-3-acetic acid [J. Am. Chem. Soc. 70, 3768 (1948)] and 30 ml. of $SOCl_2$ is allowed to stand overnight at room temperature. The solution is diluted with benzene and evaporated in vacuo, and the procedure repeated. The residue is dissolved in ca. 500 ml. of dry toluene and 29.3 g. (0.165 mole) of 4-phenyl-4-piperidinol added. The mixture is stirred and refluxed for 2 hours, allowed to stand overnight at room temperature, and filtered. The filtrate is washed successively with dilute HCl, water, NaOH, and water, dried and evaporated in vacuo to give 4-phenyl-1-[2-(3-thianaphthenyl)acetyl]-4-piperidinol.

To a stirred mixture of 14.5 g. of $LiAlH_4$ in 1 liter of dry ether is added slowly a solution of 26.3 g. (0.0824 mole) of the above amide in 100 ml. of dry tetrahydrofuran and 300 ml. of dry ether. The resulting mixture is refluxed for 2 hours, allowed to stand overnight at room temperature, and refluxed again for 2 hours. A total of ca. 60 ml. of water and 15 ml. of 10% NaOH is then added dropwise, the mixture stirred for one and one-half hours, and then filtered. The filtrate is washed with water and extracted with dilute HCl. The acidic and ethereal layers are filtered, and any solid obtained is dissolved in hot alcohol to which NaOH is added and this mixture then combined with the acidic extracts after they have been basified with NaOH. The total mixture is extracted with ether and the ethereal extracts washed, dried, and evaporated to give the title product. When the product is dissolved in alcohol and ethereal HCl added, and then ether, a hydrochloride salt, which is then recrystallized from alcohol-ether is obtained; M.P. 224–226°.

EXAMPLE 9

4-phenyl-1-[4-(3-thianaphthenyl)butyl]-4-piperidinol

To a stirred mixture of 78 g. of 57% NaH in mineral oil (44.5 g., 1.856 moles of NaH) in 1150 ml. of dry dimethyl sulfoxide, maintained in ice at 25–30°, is added dropwise a solution of 297 g. (1.856 moles) of diethyl malonate in 230 ml. of dimethyl sulfoxide. The resulting solution is stirred in a hot water bath at 50–60° for an hour and then cooled to room temperature, after which a solution of 170.0 g. (0.93 mole) of 3-chloromethylthianaphthene in 150 ml. of dry dimethyl sulfoxide is added dropwise. The resulting solution is heated on the steam bath for an hour, cooled, and poured into ice water. The mixture is extracted with ether, and the ethereal extracts washed, dried, and evaporated. The residue is distilled under vacuum, the fractions distilling at 123–232°/0.4 mm. being diethyl (3-thianaphthenylmethyl)-malonate.

A solution of 200 g. of KOH, 200 g. of water, and 131.2 g. (0.428 mole) of the above malonate in 2000 ml. of alcohol is stirred and refluxed for 4 hours and evaporated in vacuo. The residue is dissolved in water and washed with ether. The aqueous solution is cooled, acidified with concentrated HCl, and extracted with ether. The ethereal extracts are washed, dried, and evaporated in vacuo, and the residue triturated with hexane to give (3-thianaphthenyl)malonic acid, M.P. 170–171° dec.

The above malonic acid (17.5 g., 0.07 mole) is heated in an oil bath to ca. 250° and then at 230° for 1 hour. The melt is allowed to cool following the decarboxylation and 40 ml. of $SOCl_2$ added. After being allowed to stand overnight at room temperature, the mixture is refluxed on the steam bath for one-half hour and then evaporated in vacuo, benzene being added to the residue to eliminate traces of $SOCl_2$. The residue is the acid chloride of 3-(3-thianaphthenyl)-propionic acid.

A solution of diazomethane is prepared as follows: To an unscratched 2 liter Erlenmeyer flask on a magnetic stirrer with a Teflon bar immersed in a salt-ice bath is added 75 ml. of 50% KOH and 200 ml. of ether. When the internal temperature of the mixture is below 0°, 29.4 g. (0.2 mole) of N-methyl-N'-nitro-N-nitrosoguanidine is added in small portions such that the internal temperature remains below 5°. The cold mixture is stirred in a salt-ice bath for 5 mintues and allowed to settle, and the ether solution decanted into an unscratched 2 l. Erlenmeyer flask containing KOH pellets and cooled in ice. The reaction mixture is extracted with 6–100 ml. portions of cold ether, the ether extracts dried in an ice bath with KOH pellets for one-half hour, and then filtered into an unscratched 2 liter filter flask in an ice bath, equipped with a magnetic stirrer. The solution is stirred in ice while a solution of 15.7 g. (0.07 mole) of the above acid chloride in a small amount of methylene chloride is added dropwise, nitrogen being evolved. The resulting solution is allowed to stand overnight, the ice bath being allowed to warm to room temperature and the solution is evaporated in vacuo using a hot water bath, a hood, and a safety shield, to leave as the residue 1-diazo-4-(3-thianaphthenyl)-2-butanone.

To a mixture of 14.0 g. (0.079 mole) of 4-phenyl-4-piperidinol in ca. 300 ml. of dioxane which has been heated to achieve partial solution and then cooled to room temperature, is added a solution of 16.1 g. (0.07 mole) of the above diazoketone in 100 ml. of dioxane, followed by 2.0 g. of $Ag_2O$. The mixture is stirred in a water bath at 60–70° for one-half hour, nitrogen being evolved. An additional 0.5 g. of $Ag_2O$ is added, followed by heating at 60–70° for one-half hour and a final 0.5 g. portion of $Ag_2O$ added and heated. The mixture is allowed to stand overnight at room temperature and then filtered through Super-Cel, and the filtrate evaporated in vacuo. The residue is dissolved in methylene chloride, and washed with acid, base, and water, and evaporated in vacuo to give 4-phenyl-1-[4-(3-thianaphthenyl)-butyryl]-4-piperidinol.

To a stirred mixture of 5.7 g. (0.15 mole) of $LiAlH_4$ in 1000 ml. of dry ether is slowly added a solution of ca. 26 g. (0.07 mole) of the above amide in ca. 200 ml. of dry tetrahydrofuran. The resulting mixture is stirred and refluxed for 4 hours and then a total of ca. 25 ml. of water and 6 ml. of 10% NaOH added dropwise. The mixture is stirred for one-half hour and filtered. The filtrate is dried, charcoaled, filtered through Super-Cel, and evaporated in vacuo to give the title product, recrystallized from toluene; M.P. 126–131°. When the free base is dissolved in alcohol and ethereal HCl added, a hydrochloride salt is formed; recrystallized from alcohol-ether; M.P. 183–186°.

EXAMPLE 10

1-[3-(2-methyl-3-thianaphthenyl)propyl]-4-phenyl-4-piperidinol 2-methyl-3-thianaphthenecarboxylic acid is reduced with LiAlH$_4$ according to standard procedure to give 3-hydroxymethyl-2-methylthianaphthene. The hydroxymethyl group is converted to chloromethyl with SOCl$_2$ as described in Procedure 1 and the product condensed with diethyl malonate as in Example 1. By following the rest of the steps of Example 1, including hydrolysis, decarboxylation, formation of the ester anhydride and then the amide, and finally reduction with LiAlH$_4$, the title product is obtained.

EXAMPLE 11

When 5-chloro-3-methylbenzofuran-2-acetic acid and 5-methoxy-2-methylbenzofuran-3-acetic acid are substituted for the thianaphthene-3-acetic acid in the procedure of Example 8, and the acid chloride formation, amide formation, and reduction carried out as described therein, 1 - [2 - (5 - chloro - 3 - methyl - 2 - benzofuranyl)ethyl] 4-phenyl-4-piperidinol and 1-[2-(5-methoxy-2-methyl-3-benzofuranyl)ethyl]-4-phenyl-4-piperidinol, respectively, are obtained.

When 6-methoxy-3-benzofuranbutyric acid and 5-methoxy-3-thianaphthenebutyric acid are substituted for the thianaphthene-3-acetic in the procedure of Example 8, and the acid chloride formation, amide formation, and reduction carried out as described therein, 1-[4-(6-methoxy-3-benzofuranyl)butyl]-4 - phenyl - 4 - piperidinol and 1-[4-(5-methoxy-3-thianaphthenyl)butyl] - 4 - phenyl-4-piperidinol, respectively, are obtained.

EXAMPLE 12

A tablet may have the following composition:

|  | Mg. |
|---|---|
| 4-phenyl-1-[3-(3-thianaphthenyl)propyl] - 4 - piperidinol hydrochloride | 10 |
| Magnesium stearate | 2.5 |
| Starch | 15 |
| Terra alba | 150 |
| Granulate with syrup or 5% gelatin solution terra alba q.s. ad | 300 |

An injectable solution may have the following composition per cc.:

| 4-phenyl-1-[3-(2-thianaphthenyl)propyl] - 4 - piperidinol hydrochloride | mg | 5 |
|---|---|---|
| Sodium biphosphate | mg | 5 |
| Sodium tartrate | mg | 12 |
| Sodium saccharin | mg | 0.9 |
| Benzyl alcohol | percent | 0.75 |
| Water q.s. ad | cc | 1 |

EXAMPLE 13

4-phenyl-1-[3-(3-thianaphthenyl)propyl]4-piperidinol O-acetate

A solution of 4.2 g. (0.012 mole) of 4-phenyl-1-[3-(3-thianaphthenyl)propyl]-4-piperidinol and 2 or 3 drops of conc. H$_2$SO$_4$ in 100 ml. of acetic anhydride is stirred on the steam bath for 3 hours and evaporated in vacuo. The residue is warmed and stirred with 5% Na$_2$CO$_3$, then cooled, and methylene chloride added. The layers are separated and the aqueous layer washed with methylene chloride. The organic extracts are washed, dried, and evaporated in vacuo to give the title product. This free base is dissolved in alcohol, ethereal hydrogen chloride added, and the ether is added. Filtration gives the hydrochloride salt of the title product, which is triturated with ethyl acetate and recrystallized from isopropanol-ether; M.P. 173–175°.

EXAMPLE 14

4-phenyl-1-[3-(3-thianaphthenyl)propyl]-4-piperidinol O-propionate

A 7.5 g. (0.0193 mole) sample of 4-phenyl-1-[3-(3-thianaphthenyl)propyl] - 4 - piperidinol hydrochloride is converted to the free base and dissolved in 250 ml. of dry benzene. A solution of 1.8 g. (0.0193 mole) of propionyl chloride in 50 ml. of dry benzene is added, and the cloudy solution is stirred and refluxed for 1 hour and allowed to stand at room temperature overnight. The mixture is filtered and the filtrate evaporated in vacuo to give the title product. The base is dissolved in alcohol, ethereal hydrogen chloride added, and the mixture then diluted with ether. The hydrochloride salt of the title product is filtered off and recrystallized from alcohol-ether; M.P. 177–179°.

EXAMPLE 15

1,2,5,6-tetrahydro-4-phenyl-1-[3-(3-thianaphthenyl) propyl]pyridine

A mixture of 10.0 g. (0.0258 mole) of 4-phenyl-1-[3-(3-thianaphthenyl)propyl]-4-piperidinol hydrochloride and 100 ml. of 12 N HCl is stirred and refluxed for 3 hours. The solution is concentrated in vacuo, the residue is dissolved in methanol, benzene is added, and the mixture is evaporated to dryness. Recrystallization of the residue from ethanol-ether gives the hydrochloride of the title product, M.P. 197–200°. The free base is obtained in the usual manner.

When the following piperidinols are dehydrated according to the above procedure, the corresponding listed tetrahydropyridines are obtained.

Piperidinol:
    1-[3-(5-chloro-2-thianaphthenyl propyl]-4-phenyl-4-piperidinol
    4-phenyl-1-[3-(2-thianaphthenyl)propyl]-4-piperidinol
    1-[3-(2-benzofuranyl)propyl]-4-phenyl-4-piperidinol
    4-phenyl-1-[2-(3-thianaphthenyl)ethyl]-4-piperidinol
    4-phenyl-1-[4-(3-thianaphthenyl)butyl]-4-piperidinol Tetrahydropyridine:
    1-[3-(5-chloro-2-thianaphthenyl)propyl]-1,2,5,6-tetrahydro-4-phenylpyridine
    1,2,5,6-tetrahydro-4-phenyl-1-[3-(2-thianaphthenyl) propyl]pyridine
    1-[3-(2-benzofuranyl)propyl]-1,2,5,6-tetrahydro-4-phenylpyridine
    1,2,5,6-tetrahydro-4-phenyl-1-[2-(3-thianaphthenyl) ethyl]pyridine
    1,2,5,6-tetrahydro-4-phenyl-1-[4-(3-thianaphthenyl) butyl]pyridine

EXAMPLE 16

1-[3-(1,1-dioxo-3-thianaphthenyl propyl]-4-phenyl-4-piperidinol

A solution of 4.64 g. (0.012 mole) of 4-phenyl-1-[3-(3-thianaphthenyl)propyl]-4 - piperidinol hydrochloride, 40 ml. of glacial acetic acid, and 12 ml. of 30% H$_2$O$_2$ is heated at 60° for 1 hour. The mixture is stirred and refluxed for 15 minutes then diluted with ice water, made alkaline with NaOH, and extracted with methylene chloride. The organic extracts are washed, dried, and concentrated to give the title product. Addition of hydrogen chloride to an isopropanol solution of the product, followed by ether gives the hydrochloride salt; M.P. 228.5–230°.

When the following thianaphthene compounds are oxidized according to the above procedure, the corresponding listed sulfones are obtained.

Thianaphthene:
    1-[3-(5-chloro-2-thianaphthenyl)propyl]-4-phenyl-4-piperidinol
    4-phenyl-1-[3-(2-thianaphthenyl)propyl]-4-piperidinol 4-phenyl-1-[2-(3-thianaphthenyl)ethyl]-4-piperidinol
4-phenyl-1-[4-(3-thianaphthenyl)butyl]-4-piperidinol Sulfone:
1-[3-(5-chloro-1,1-dioxo-2-thianaphthenyl)propyl]-4-phenyl-4-piperidinol
1-[3-(1,1-dioxo-2-thianaphthenyl)propyl]4-phenyl-4-piperidinol
1-[2-(1,1-dioxo-3-thianaphthenyl)ethyl]-4-phenyl-4-piperidinol
1-[4-(1,1-dioxo-3-thianaphthenyl)butyl]-4-phenyl-4-piperidinol

PROCEDURE 1

5-chloro-2-chloromethylthianaphthene

Dry ether (50 ml.) is added slowly to a cooled solution of 7.925 g. (0.124 mole) of butyl lithium in 80 ml. of hexane under nitrogen. The cooled solution is stirred, a solution of 16.8 g. (0.1 mole) of 5-chlorothianaphthene in 50 ml. of dry ether is added slowly, and the resulting solution is stirred in ice for 2 hours. A 9.5 g. (0.32 mole) sample of paraformaldehyde (dried by heating on the steam bath for 2 hours in vacuo) is placed in an oil bath at about 190°, and the formaldehyde is swept into the reaction mixture with nitrogen. After addition is complete (ca. 1 hour), the mixture is stirred and refluxed for 2–3 hours, and then allowed to stand overnight. The mixture is diluted with 7.5 ml. of alcohol to destroy the remaining butyl lithium and then with ca. 200 ml. of aqueous salt solution. The layers are separated, the aqueous layer is washed with ether, and the combined etheral extracts are washed, dried, and evaporated in vacuo to give a solid. Trituration with petroleum ether and recrystallization from toluene gives 5-chloro-2-hydroxymethylthianaphthene, M.P. 122–124.5°.

To a stirred solution of 13.0 g. (0.0655 mole) of this compound in 100 ml. of chloroform is added dropwise 12.0 ml. of SOCl$_2$. The resulting mixture is stirred and refluxed for a half hour and then evaporated in vacuo. The residue is dissolved in benzene and again evaporated to give the title compound.

5-chlorothianaphthene, as well as the 5, 6, and 7-methylthianaphthenes, is described in Chemical Abstracts 47, 12346 gh.

We claim:
1. A member selected from the group consisting of compounds of the formula

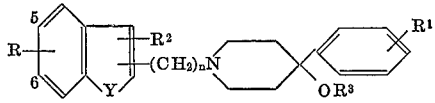

and the pharmaceutically acceptable acid addition salts thereof, wherein:

R is at the 5 or 6-position and is hydrogen, chloro, bromo, fluoro, trifluoromethyl, lower alkyl of 1–4 carbon atoms, or lower alkoxy of 1–4 carbon atoms;
$R^1$ is hydrogen, chloro, bromo, methyl, trifluoromethyl, fluoro, or methoxy;
$R^2$ is hydrogen or methyl;
$R^3$ is hydrogen;
Y is oxygen, sulfur, or sulfone; and
n is a positive integer from 2 to 4.

2. A compound as claimed in claim 1, where $R^2$ is hydrogen.
3. A composition as claimed in claim 2, where n is 3.
4. A composition as claimed in claim 3, where Y is sulfur.
5. A compound as claimed in claim 4, where R is hydrogen, chloro, or fluoro; $R^1$ is at the p-position and is hydrogen, chloro, or fluoro; and $R^3$ is hydrogen.

6. A compound as claimed in claim 5, where R and $R^1$ are both hydrogen, being the compound 4-phenyl-1-[3-(3-thianaphthenyl)propyl]-4-piperidinol or its hydrochloride salt.
7. A compound as claimed in claim 5, where R and $R^1$ are both hydrogen, being the compound 4-phenyl-1-[3-(2-thianaphthenyl)propyl]-4-piperidinol or its hydrochloride salt.
8. A compound as claimed in claim 5, where R is 5-chloro and $R^1$ is hydrogen, being the compound 1-[3-(5-chloro-2-thianaphthenyl)propyl]-4-phenyl-4-piperidinol or its hydrochloride salt.
9. A compound as claimed in claim 5, where R is hydrogen and $R^1$ is chloro, being the compound 4-p-chlorophenyl-1-[3-(3-thianaphthenyl)propyl]-4-piperidinol or its hydrochloride salt.
10. A compound as claimed in claim 2, where R is hydrogen, $R^1$ is p-methyl, n is 3, and Y is sulfur, being the compound 1-[3 - (3 - thianaphthenyl)propyl]-4-p-tolyl-4-piperidinol or its hydrochloride salt.
11. A compound as claimed in claim 2, where R is hydrogen, $R^1$ is p-trifluoromethyl, n is 3, and Y is sulfur, being the compound 1-[3-(3-thianaphthenyl)propyl]-4-p-trifluoromethylphenyl-4-piperidinol or its hydrochloride salt.
12. A compound as claimed in claim 5, where R and $R^1$ are both chloro, being the compound 4-p-chlorophenyl-1-[3-(6-chloro-3-thianaphthenyl)propyl]-4-piperidinol or its hydrochloride salt.
13. A compound as claimed in claim 5, where R is 6-fluoro and $R^1$ is chloro, being the compound 4-p-chlorophenyl-1-[3-(6-fluoro-3-thianaphthenyl)propyl] - 4-piperidinol or its hydrochloride salt.
14. A compound as claimed in claim 2, where R and $R^1$ are hydrogen, n is 2, and Y is sulfur, being the compound 4-phenyl-1-[2-(3-thianaphthenyl)ethyl] - 4 - piperidinol or its hydrochloride salt.
15. A compound as claimed in claim 2, where R and $R^1$ are hydrogen, n is 4, and Y is sulfur, being the compound 4-phenyl-1-[4-(3-thianaphthenyl)butyl] - 4 - piperidinol or its hydrochloride salt.
16. A compound as claimed in claim 1, where Y is oxygen.
17. A compound as claimed in claim 16, where R, $R^1$, and $R^2$ are each hydrogen and n is 3, being the compound 1-[3-(3-benzofuranyl)propyl]-4-phenyl - 4 - piperidinol or its hydrochloride salt.
18. A compound as claimed in claim 16, where R, $R^1$, and $R^2$ are each hydrogen and n is 3, being the compound 1-[3-(2-benzofuranyl)propyl]-4-phenyl - 4 - piperidinol or its hydrochloride salt.

References Cited

UNITED STATES PATENTS 3,070,606   12/1962   Anderson   260—293.45

FOREIGN PATENTS 632,437   12/1961   Canada.

OTHER REFERENCES

J. Neuropharmacol, 1962, vol. 1, pp. 145–48; Janssen.

HENRY R. JILES, Primary Examiner
S. D. WINTERS, Assistant Examiner

U.S. Cl. X.R.

260—294, 294.3, 294.7, 294.8, 297, 330.5, 346.2; 424—267